US010369704B2

(12) United States Patent
Chiappetta et al.

(10) Patent No.: US 10,369,704 B2
(45) Date of Patent: Aug. 6, 2019

(54) BASE SYSTEMS FOR SUPPORTING SOFT ROBOTIC ACTUATORS

(71) Applicant: Soft Robotics, Inc., Cambridge, MA (US)

(72) Inventors: Mark J. Chiappetta, Westford, MA (US); Ryan Knopf, Cambridge, MA (US); Joshua Aaron Lessing, Cambridge, MA (US); Jeffrey Curhan, Warwick, RI (US)

(73) Assignee: Soft Robotics, Inc., Cambridge, MA (US)

( * ) Notice: Subject to any disclaimer, the term of this patent is extended or adjusted under 35 U.S.C. 154(b) by 0 days.

(21) Appl. No.: 15/844,062

(22) Filed: Dec. 15, 2017

(65) Prior Publication Data

US 2018/0169869 A1 Jun. 21, 2018

Related U.S. Application Data

(60) Provisional application No. 62/435,213, filed on Dec. 16, 2016.

(51) Int. Cl.
*B25J 15/00* (2006.01)
*B25J 15/10* (2006.01)
(Continued)

(52) U.S. Cl.
CPC ....... *B25J 15/0023* (2013.01); *B25J 15/0475* (2013.01); *B25J 15/10* (2013.01); *B25J 15/12* (2013.01)

(58) Field of Classification Search
CPC .... B25J 15/12; B25J 15/0085; B25J 15/0608; B25J 15/0023; B25J 15/0408;
(Continued)

(56) References Cited

U.S. PATENT DOCUMENTS 3,343,864 A * 9/1967 Baer .................... B25J 15/0009 294/119.3
3,713,685 A * 1/1973 Ewing ...................... B25J 15/12 294/119.3
(Continued)

FOREIGN PATENT DOCUMENTS

DE 102004029051 B3 7/2005
EP 0198379 A2 10/1986
(Continued)

OTHER PUBLICATIONS

International Search Report and Written Opinion of PCT/US2017/066764; dated May 11, 2018, 18 pages.

*Primary Examiner* — Stephen A Vu

(57) ABSTRACT

The present application relates to improvements in support systems for holding one or more robotic actuators, particularly soft robotic actuators. Because soft robotic actuators tend to push away from a base to which they are fixed upon inflation, they must be hold to the base securely. However, this may render it more difficult to remove the actuator from the base (e.g., when the actuator fails, when the actuator and/or base must be cleaned or serviced, or when a user wishes to switch out one style or size of actuator for another). Exemplary embodiments herein relate to improved designs for hubs, including interlocking and quick-release mechanisms that allow the actuator to be held firmly to the hub, but also allow the actuator to be quickly and efficiently released, when needed.

12 Claims, 16 Drawing Sheets

ACTUATOR 100
HUB BASE 202
INTERNAL SUPPORT 206
COLLAR 204
208 COLLAR PIN HOLES
210 RELEASE MECHANISM

(51) Int. Cl.
*B25J 15/04* (2006.01)
*B25J 15/12* (2006.01)

(58) Field of Classification Search
CPC ........ B25J 15/0009; B25J 15/10; B25J 9/142; B25J 15/0475; B66C 1/46
See application file for complete search history.

(56) References Cited

U.S. PATENT DOCUMENTS

| | | | | |
|---|---|---|---|---|
| 4,928,926 | A * | 5/1990 | Bloemendal | B66F 3/35 254/93 R |
| 5,083,498 | A * | 1/1992 | Sato | F15B 15/125 73/731 |
| 5,156,081 | A * | 10/1992 | Suzumori | B25J 15/12 91/525 |
| 5,251,538 | A * | 10/1993 | Smith | F16J 3/06 92/34 |
| 6,267,422 | B1 * | 7/2001 | Alba | B66C 1/66 294/215 |
| 7,258,379 | B2 * | 8/2007 | Ono | B25J 9/142 294/119.3 |
| 2005/0218679 | A1 * | 10/2005 | Yokoyama | B25J 9/142 294/99.1 |
| 2014/0167432 | A1 * | 6/2014 | Heriban | B25J 7/00 294/196 |
| 2016/0136820 | A1 | 5/2016 | Lessing et al. | |
| 2016/0361821 | A1 | 12/2016 | Alcedo et al. | |

FOREIGN PATENT DOCUMENTS

| | | | |
|---|---|---|---|
| FR | 2720679 | A1 | 12/1995 |
| WO | 2016210438 | A1 | 12/2016 |

* cited by examiner

BASE SYSTEMS FOR SUPPORTING SOFT ROBOTIC ACTUATORS

RELATED APPLICATIONS

This application claims priority to U.S. Provisional Application Ser. No. 62/435,213, filed on Dec. 16, 2016 and entitled "Base Systems for Supporting Soft Robotic Actuators." The contents of the aforementioned application are incorporated herein by reference.

FIELD OF THE DISCLOSURE

The disclosure relates generally to the field of robotics and particularly to novel base systems for supporting soft robotic actuators.

BACKGROUND

Robotic manipulators have traditionally employed relatively hard effectors (e.g., fingers) to grasp or move objects. Recently, soft actuators have begun to be used; soft actuators conform to a target and are therefore more suitable than hard actuators for a number of delicate tasks (such as handling of food or other fragile items).

Robotic actuators are often mounted to a robotic arm to allow the actuators to be positioned where needed. Soft actuators especially need to be mounted securely so that they do not pull away from the surface to which they are mounted when they are inflated. As a result, it can sometimes be difficult to switch one actuator for another, such as when an actuator fails or is nearing the end of its service life.

SUMMARY

Described herein are a number of novel hubs to allow individual actuators (or groups of actuators) to be quickly removed or replaced.

DETAILED DESCRIPTION

Figure 1A:
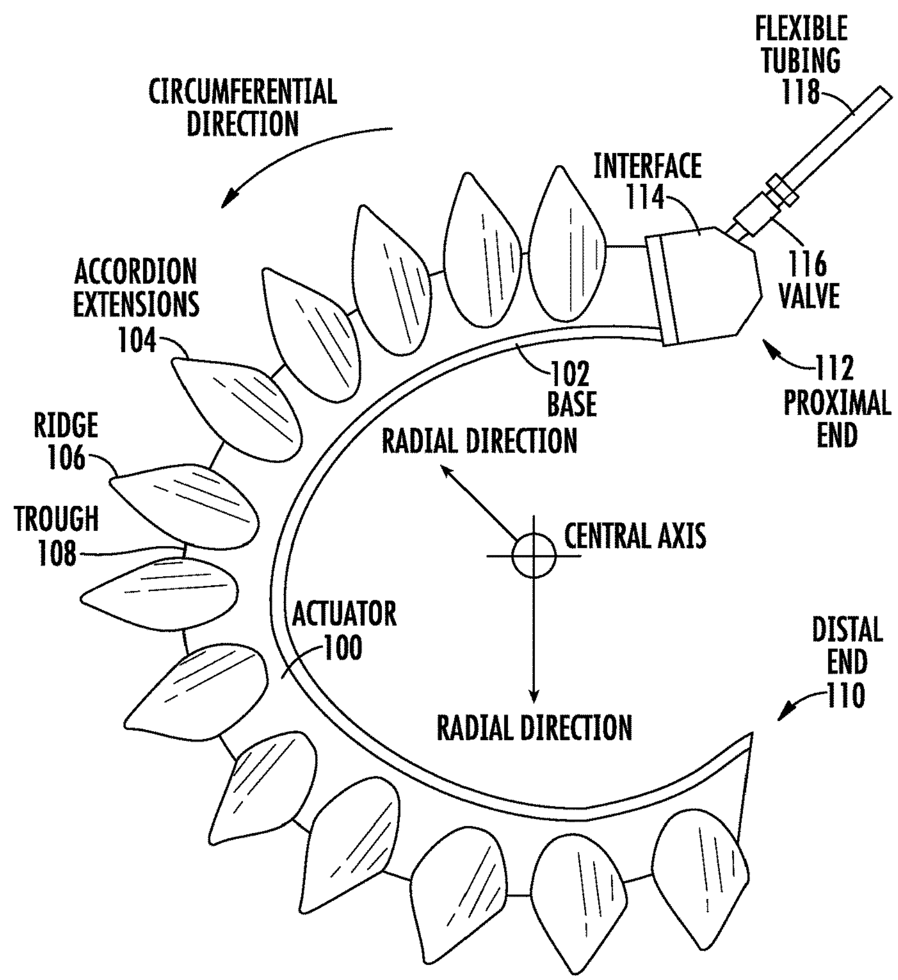
FIGS. 1A-1D depict examples of a soft robotic actuator system.

The present invention will now be described more with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Introduction to Soft Robotic Grippers

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, and/or bend under pressure, or other suitable relatively soft materials. They may be created, for example, by molding one or more pieces of the elastomeric material into a desired shape. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Moreover, soft robotic actuators allow for types of motions or combinations of motions (including bending, twisting, extending, and contracting) that can be difficult to achieve with traditional hard robotic actuators.

Figure 1B:
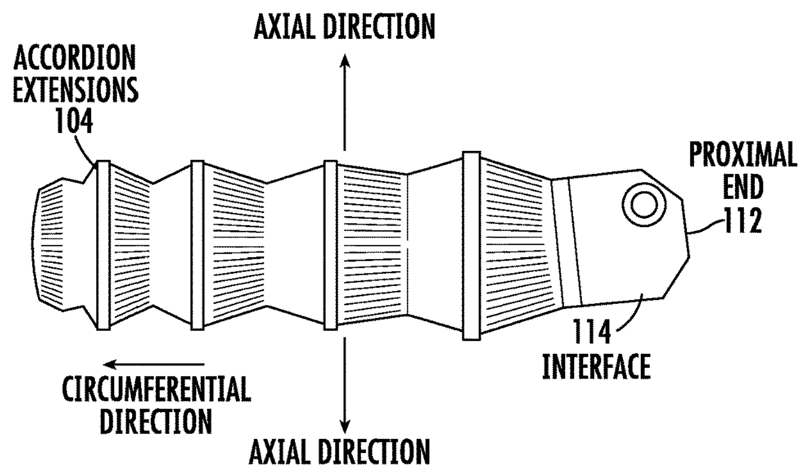
Figure 1C:
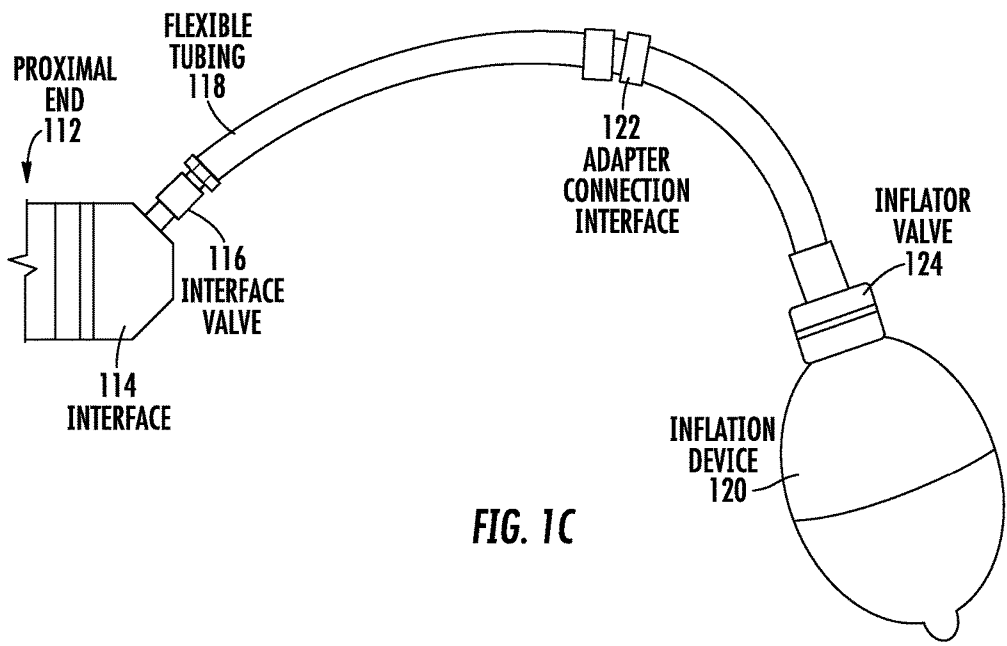
Figure 1D:
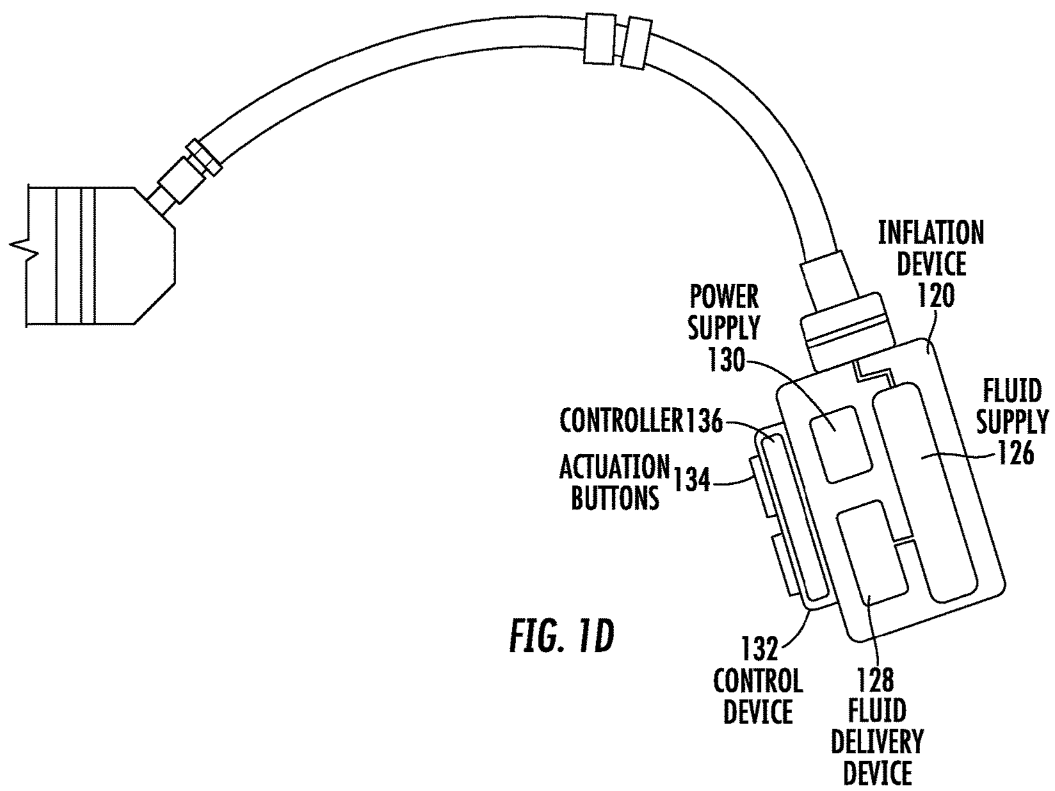

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, or saline. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated, and help to define the shape of the actuator 100 when in an inflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the retractor to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts of the incision retractor. The interface 114 may be made of a medically safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch). The control device 132 may include a controller 136 for sending a control signal to the fluid delivery device 128 to cause the fluid delivery device 128 to supply inflation fluid to, or withdraw inflation fluid from, the actuator 100.

Spring-Loaded Quick-Change Hub for Soft Robotic Actuators

Described below are a number of novel hubs to allow individual actuators (or groups of actuators) to be quickly removed or replaced. Such a capability may be useful in repair or maintenance scenarios, as well as providing opportunities to quickly replace one size or configuration of actuator for another (e.g., replacing one actuator with a larger or smaller actuator, or an actuator with a different bending profile) in order to accommodate different tasks or configurations of objects to be grasped.

Figure 2A:
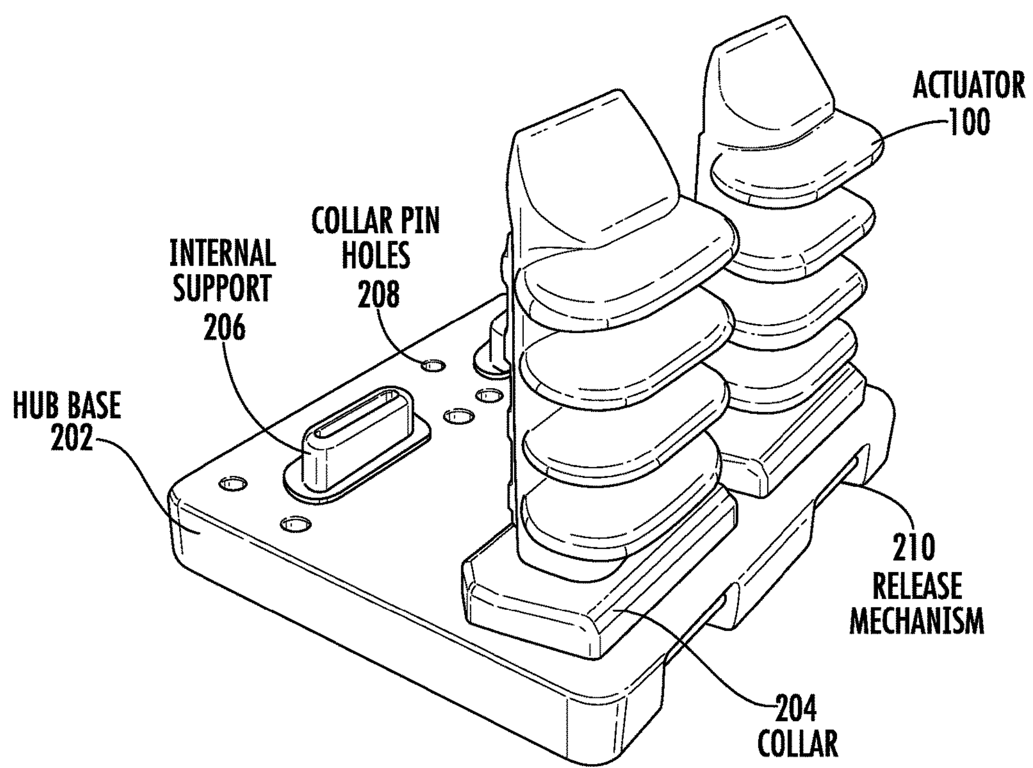
FIGS. 2A-2C depict an exemplary hub for supporting a soft actuator using a collar.
Figure 2B:
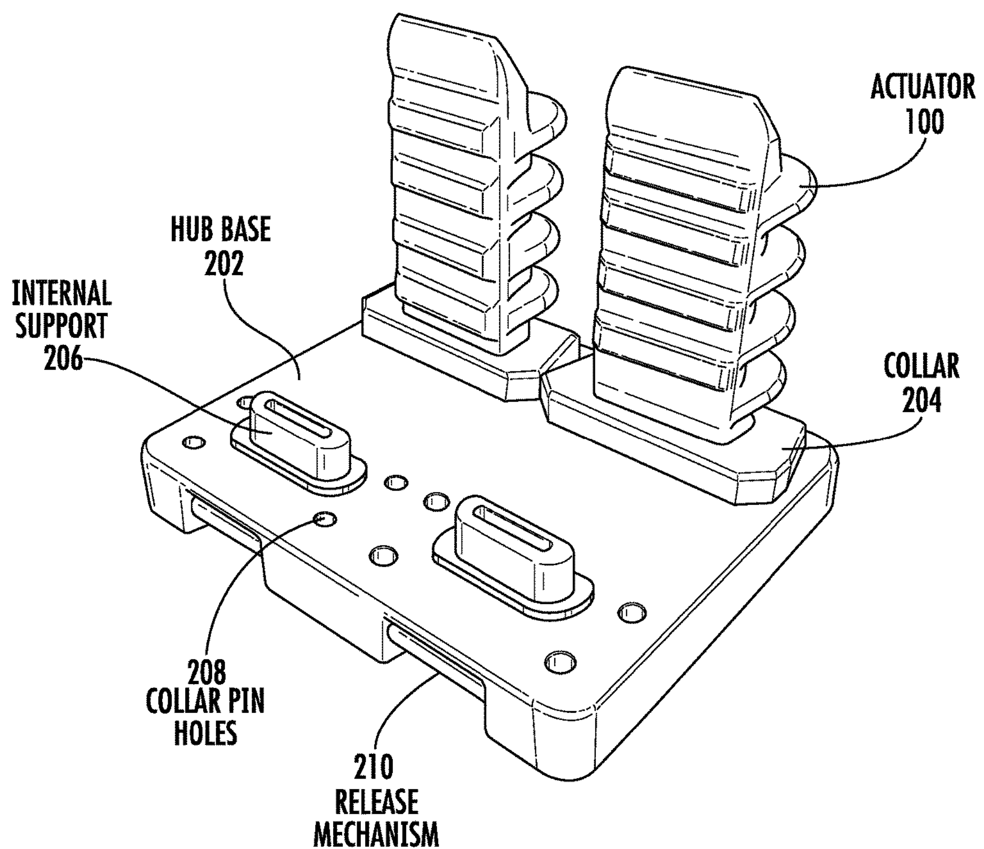
Figure 2C:
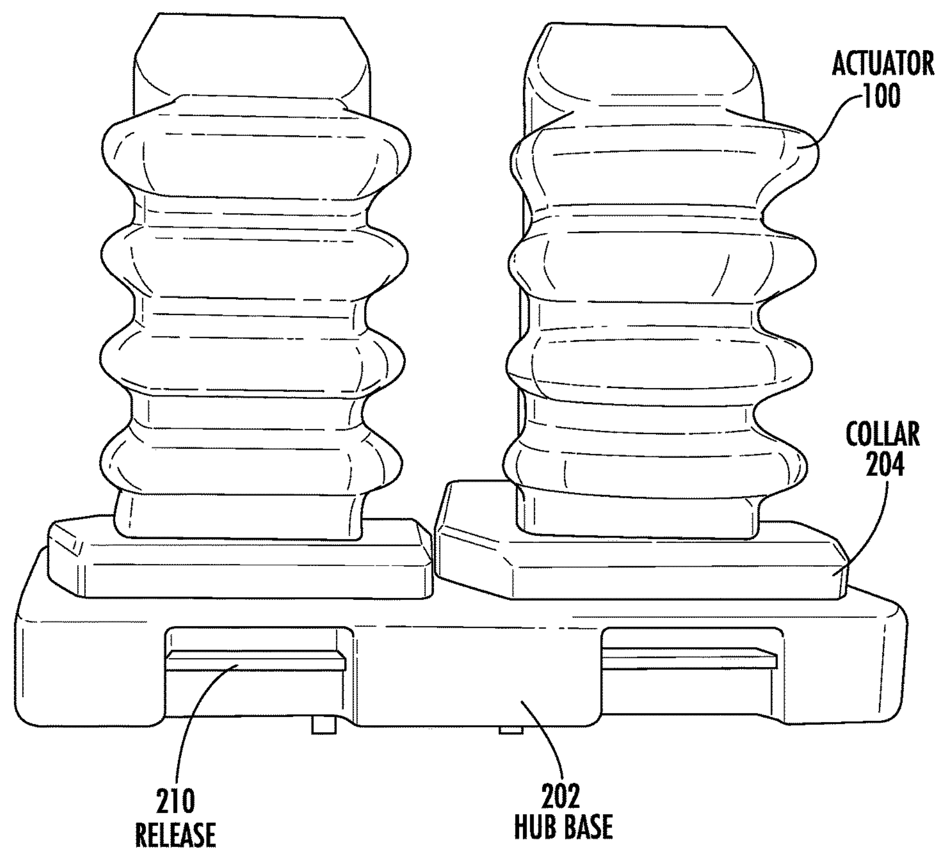

FIGS. 2A-2C depict an exemplary hub base 202 capable of supporting four actuators 100 (two pairs of opposing actuators) in a gripper configuration. The actuators 100 are inserted through a collar 204, which supports and restrains the actuator 100. The actuator 100 and collar 204 are inserted over an internal support 206 of the hub base 202, where the internal support 206 both supports the actuator 100 and includes a fluid flow path for providing an inflation fluid and/or vacuum to an internal bladder, reservoir, or void of the actuator 100 to inflate or deflate the actuator 100. The internal support may be configured in such a way that it does not obstruct the flow of air into the actuator and that it helps to pneumatically seal the actuator to the hub base 202. The internal support may optionally be provided with one or more barbs, described in more detail in connection with FIGS. 8A-8C, below.

The actuator 100 is oriented and secured on the hub base 202 via a set of specially-shaped collar posts (described in more detail in connection with FIGS. 3A-3B), which are inserted into corresponding collar post holes 208 in the base 202. The internal structure of the base (described in more detail in connection with FIGS. 4A-4C) is such that the collar posts are captured and secured when inserted into the collar post holes 208. More specifically, inside the hub base a spring-loaded retaining structure is provided for capturing the collar posts and thereby securing the actuator to the hub base. A release mechanism 210 on the external side of the hub base activates the spring-loaded retaining structure to allow the collar posts to be inserted into the post holes 208 and/or removed from the post holes 208.

Figure 3A:
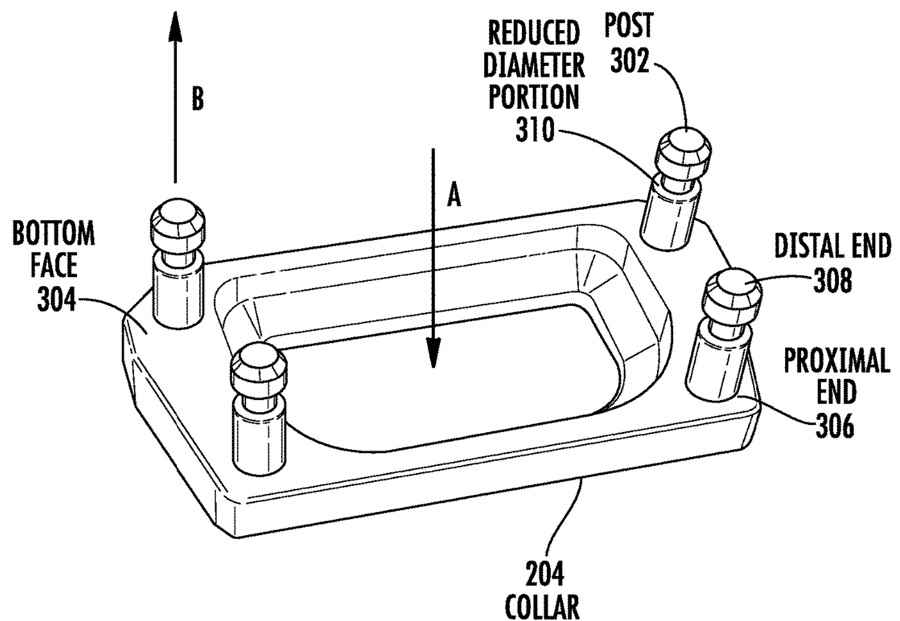
FIGS. 3A-3B depict an exemplary collar for securing an actuator to a hub.

FIG. 3A depicts a close-up view of the bottom of the collar 204, showing the posts 302 for insertion through the post holes 208. In use, an actuator 100 may be inserted through the opening in the collar in the direction of the arrow labeled "A" (e.g., the distal end 110 of the actuator 100 may be inserted through the opening, with a flange at the proximal end 112 of the actuator 100 being in direct facing contact with the bottom face 304 of the collar 204). The posts 302 of the collar 204 may then be inserted through the post holes 208 of the hub base 202 in the direction of the arrow labeled "B." The posts 302 each extend from a proximal end 306 on the bottom face 304 of the collar 204 to a distal end 308. Near the distal end 308, each post 302 includes a reduced-diameter portion 310 that is secured by the spring-loaded retaining structure in the hub base 202, preventing the collar 204 and secured actuator 100 from pulling away from the hub base 202.

More specifically, when the actuator 100 is inflated, a force may be exerted by the actuator 100 against the collar 204 in the "A" direction. The spring-loaded retaining structure, which fits into the reduced-diameter portion 310 of the posts 302, holds the posts 302 in place and thereby prevents the collar 204 from pulling away in the "A" direction. When it comes time to release the actuator 100 and collar 204, the release mechanism 210 on the hub 202 may be engaged. When the release mechanism 210 is engaged, the spring-loaded retaining structure may be moved out of reduced-diameter portion 310 of the posts 302, thereby allowing the collar 204 to be removed from the hub base 202 by pulling it in the "A" direction.

In the embodiment depicted in FIG. 3A, the distal tips 308 of the posts 302 have a circular cross-section; however, other shapes are also possible. For example, by providing an appropriately-shaped cut-out or wedge on the distal ends 308 of the posts 302, the spring-loaded retaining structure may be automatically retracted when the posts 302 are inserted into the post holes 208. The spring-loaded retaining structure may then automatically snap into place due to a spring force when the reduced-diameter portions 310 of the posts is moved over the structure. When it comes time to remove the collar, the release mechanism 310 may be engaged to move the spring-loaded retaining structure out of the way.

As further shown in FIG. 3A, the body of the collar 302 may include an opening sized and shaped to receive the actuator. The opening may have straight walls or, as shown in FIG. 3A, have walls shaped such that, in a transition from a top face of the collar 304 to the bottom face 304 of the collar 302, the walls have a cross-sectional shape corresponding to an external support structure of the actuator 100 (e.g., an actuator flange). For example, near the top face of the collar 204, the opening may have a relatively small diameter corresponding to the size and shape of the proximal end of the actuator 100. Near the bottom face 304 of the collar 204, the opening may have a relatively larger diameter corresponding to a size and shape of a top of the external support structure of the actuator. The external structure of the actuator may, upon inflation, push against the wall of the opening to further hold the actuator in place.

Figure 3B:
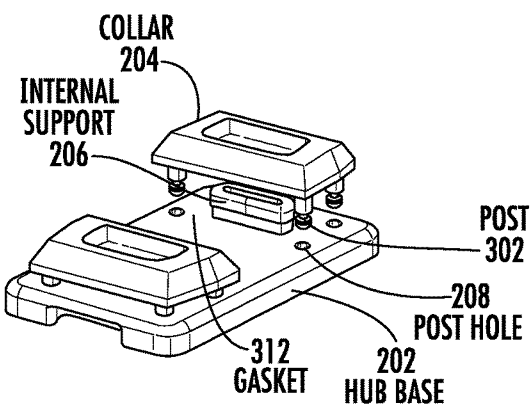

FIG. 3B depicts an example of a hub 202 having an inserted collar 204 (foreground) and collar 204 being aligned for insertion over the post-holes 208 and internal support 206 (background). An optional gasket 312 is provided to better seal the collar 204 against the hub base 202. For clarity, the collar 204 is shown without an actuator 100 inserted, although in practice the collar 204 would be inserted into the hub base 202 with an actuator 100 already inserted into the collar 204.

Figure 4A:
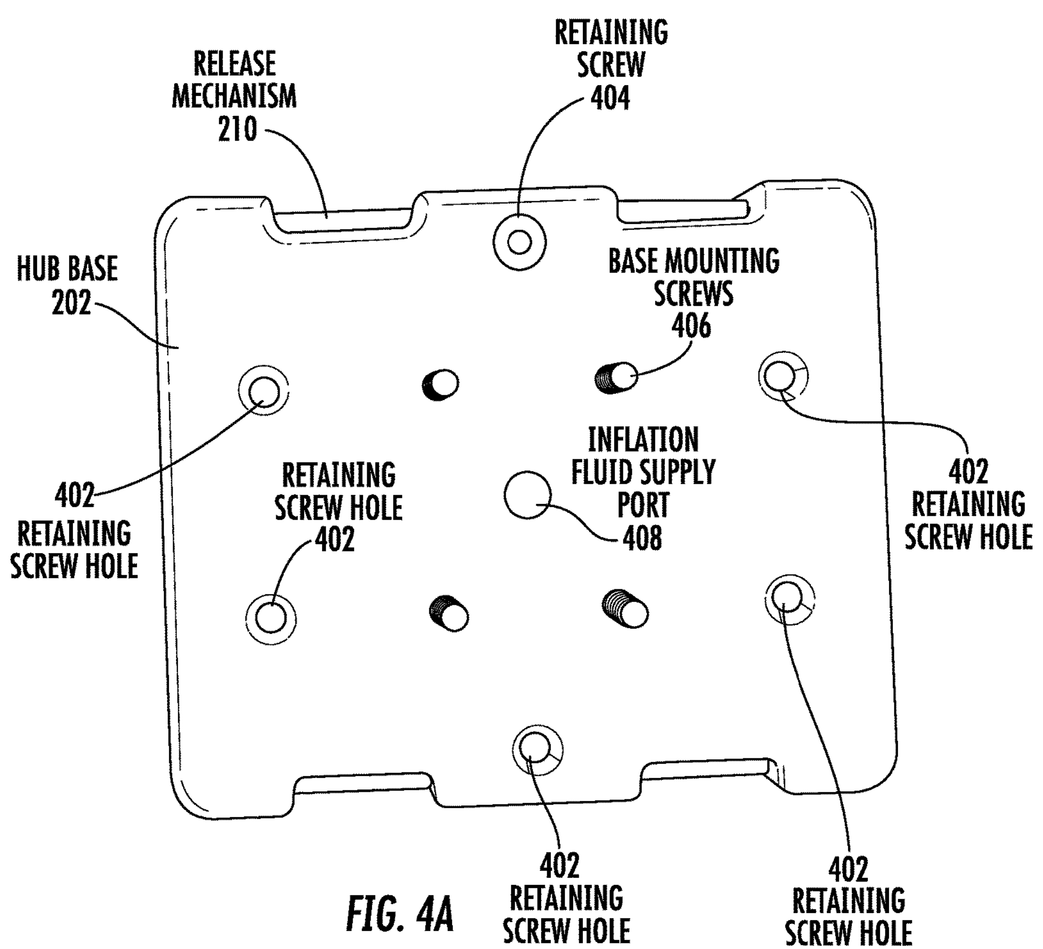
FIGS. 4A-4C depict the internal and external structures of the hub in more detail.
Figure 4B:
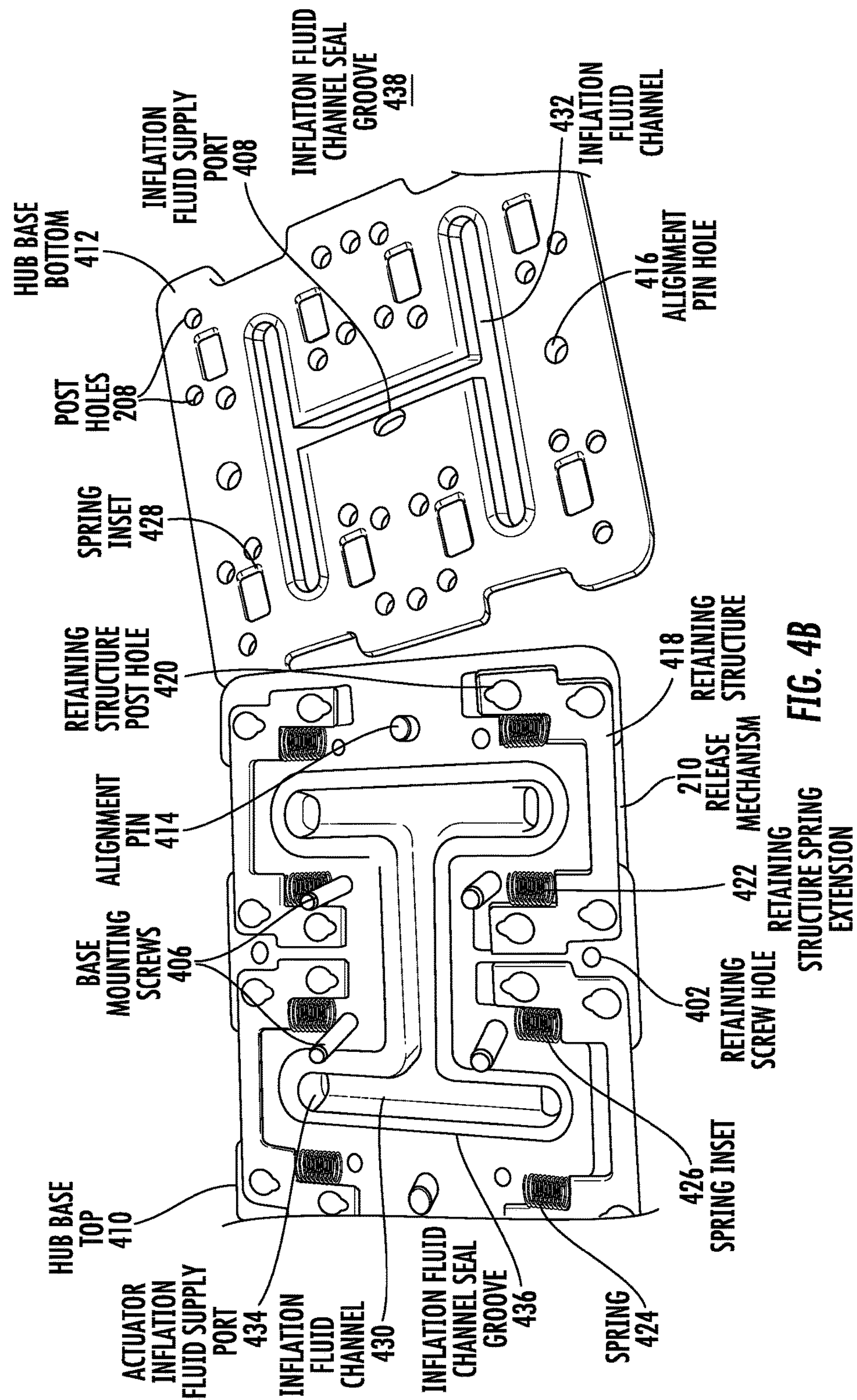
Figure 4C:
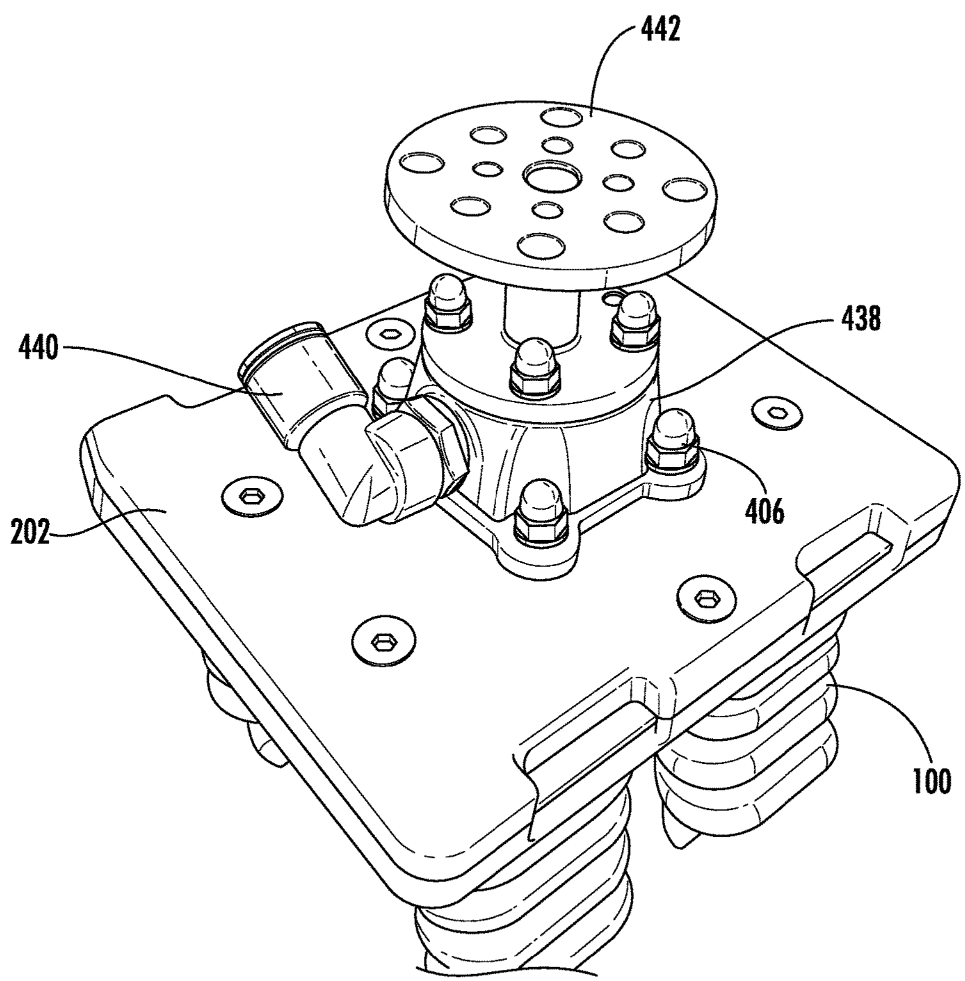

FIGS. 4A-4C depict the hub base 202 in more detail. According to exemplary embodiments, the hub base 202 may be split into two parts, a top 410 and a bottom 412 (FIG. 4B). On the externally-facing side of the bottom of the hub base 202 (FIG. 4A), retaining screws 404 may be fed through threaded retaining screw holes 402 to secure the bottom of the hub base 202 to the top of the hub base 202. An inflation fluid supply port 408 may provide an opening through which inflation fluid may be supplied (or removed by applying a vacuum).

One or more base mounting screws 408 (four, in this example) may extend outward from the bottom of the hub base 202 and may provide mounting elements that may be secured directly or indirectly to a platform, such as a robotic arm (thereby allowing the hub assembly with connected actuators to serve as a robotic gripper). For example, FIG. 4C depicts an exemplary manifold 438 attached to the base mounting screws, the manifold 438 configured to supply the inflation fluid from an inlet/outlet pipe 440. A pedestal 442 is mounted, either via the base mounting screws 406 or via a separate fastening mechanism, to the manifold 438. The pedestal 442 includes fixturing holes for mounting the pedestal 442 to a platform, such as a robotic arm.

Returning to FIG. 4B, the internal structure of the hub base top 410 and hub base bottom 412 are shown in more detail. The inflation fluid supply port 408 on the hub base bottom 412 feeds into an inflation fluid channel 432 configured to distribute the inflation fluid to the actuators mounted on the hub base top 410. A corresponding inflation fluid channel 430 is provided on the hub base top 410 (note that, in FIG. 4B, the hub base bottom 412 is rotated ninety degrees in comparison to the hub base top 410). Actuator inflation fluid supply ports 434 in the top inflation fluid channel 430 provide a path to distribute the inflation fluid to individual actuators. The inflation fluid channels 430, 432 may be sealed by placing an appropriate seal in a inflation fluid channel seal grooves 436, 438 that surround the inflation fluid channels 430, 432.

The hub base top 410 may be secured to the hub base bottom 412 by retaining screws inserted through the retaining screw holes 402 (six in the depicted example—two on the left sides of the hub base top 410, two on the right sides of the hub base top 410, and one each in the center top and center bottom of the hub base top 410; corresponding holes are located in the hub base bottom 412). The hub base top 410 and the hub base bottom 412 may be aligned to each other through the use of alignment pins 414 in the hub base top 410 that mate with corresponding alignment pin holes 416 in the hub base bottom 412. The alignment pin holes 416 on the hub base bottom 412 may extend partially, but not entirely, through the hub base bottom 412.

As can be seen in FIG. 4B, the release mechanism 210 is part of a spring-loaded retaining structure 418. The spring-loaded retaining structure 418 is encouraged into a neutral (unloaded) position through a first force applied by a spring 424 under a base amount of tension (which may be no tension and no force). When the release mechanism 210 is engaged by pushing against the retaining structure 418, the release mechanism 210 is displaced into a engaged (loaded) position. In this position, the springs 424 may be compressed, resulting in a second force (larger than the first force) applied when the spring is under an engaged amount of tension (larger than the base amount of tension). Upon releasing the release mechanism 210, the spring encourages the retaining structure 418 back to the neutral (unloaded position). It is noted that alternative means for applying force to the retaining structure 418 (in place of, or in addition to, springs 424) may also be used.

The springs 424 are positioned over spring extensions 422 on the retaining structure 418 (e.g., tabs extending from the retaining structure 418 that pass through the springs 424). The springs 424 are positioned within spring insets 426, 428 in the hub base top 410 and hub base bottom 412.

The retaining structure 418 also includes retaining structure post holes 420 for receiving the posts 302 of the collar 204. In this embodiment, the retaining structure post holes 420 have a keyhole shape, with a full-diameter main portion and a reduced-diameter secondary portion. The full-diameter main portion is sized and shaped to allow the posts 302 of the collar 204 to pass freely through the post holes 420. The reduced-diameter secondary portion is sized and shaped to accommodate the reduced-diameter portion 310 of the posts of the collar, but is too small for the main body of the post 302 to pass through.

When the release mechanism 418 is in the neutral, unloaded position (the position depicted in FIG. 4B), the reduced-diameter secondary portion is positioned over the post holes 208 of the hub base top 410. The reduced-diameter secondary portion of the release mechanism 418 wraps around the reduced-diameter portion 310 of the posts 302 to grasp the posts 302 and secure them to the hub base 202. Displacement of the actuator 100 and/or collar 204 (which tends to pull the posts 302 up or down against the release mechanism post holes 420) is prevented when the full-sized portion of the posts 302 meet the reduced-diameter secondary portions of the release mechanism post holes 420.

When the release mechanism 418 is in the engaged, loaded position, the retaining structure post holes 420 are displaced so that the full-diameter main portion of the retaining mechanism post holes 420 are positioned over the post holes 208 of the hub base top 410. In this position, the posts 302 may freely pass through the post holes 208 so that the collar 204 may be inserted into or removed from the hub base 202.

Compact Spring-Loaded Quick-Change Hub

Figure 5:
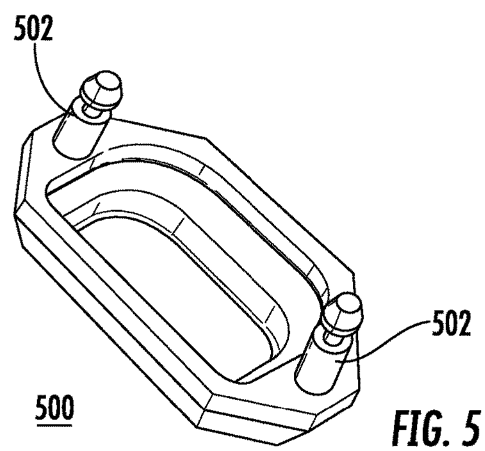
FIG. 5 depicts an alternate version of the collar.

In an alternative embodiment, the collar may be provided in a more compact configuration having fewer posts and a reduced size. An example of such a collar 500, including two posts 502, is depicted in FIG. 5. The hub base may be correspondingly reconfigured to accommodate the more compact collar. In this configuration, more actuators may be provided in the same amount of space (or in more compact formations), allowing for more freedom in gripper arrangement.

Collars and hubs in other configurations (e.g., including more or fewer posts, different shapes, etc.) are also contemplated within the scope of this disclosure.

Snap-in Quick-Change Hub

The above-described spring-loaded quick-change hub provides a very secure connection for one or more actuators. In some cases (e.g., testing, rapid prototyping, etc.), such a secure connection may not be needed, or it may be desirable to provide a quick-change hub that does not require the removal of retaining screws to open the hub body. Moreover, it may be undesirable in some situations to utilize small screws, springs, etc., as these tend to create crevices in the mechanism. Such crevices may provide undesirable harborage points, for example in applications involving food safety. FIGS. 6A-6I depict an example of a quick-change hub 600 that can be snapped into place without tools.

Figure 6A:
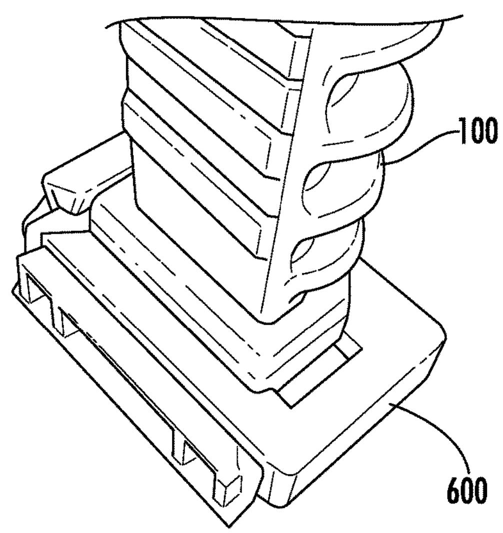
FIGS. 6A-6I depict an example of a snap-together hub-and-collar assembly.

FIG. 6A shows the hub 600 in an assembled form. The hub 600 is provided in three parts: a collar for receiving the actuator 100, a hub base into which the collar is inserted, and a locking pin for securing the collar to the hub base.

Figure 6B:
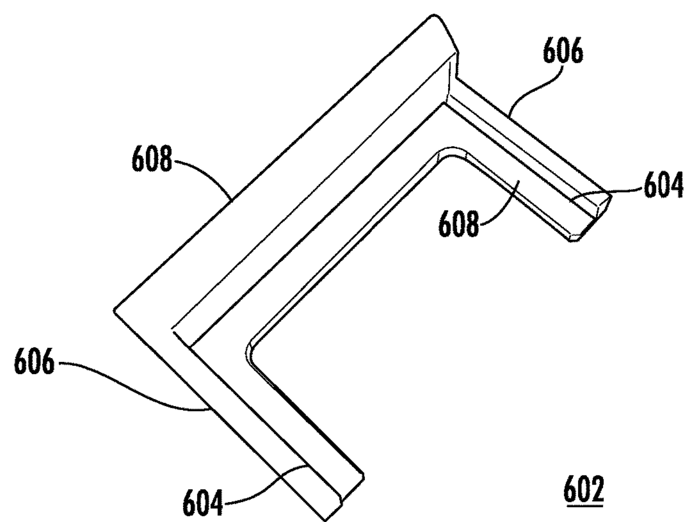
Figure 6C:
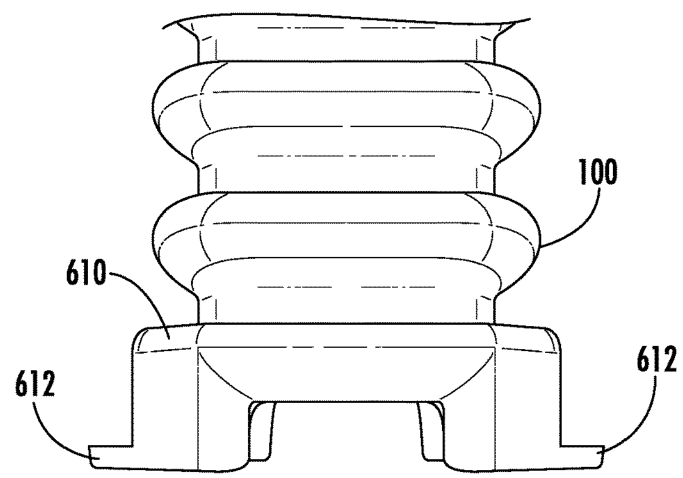
Figure 6D:
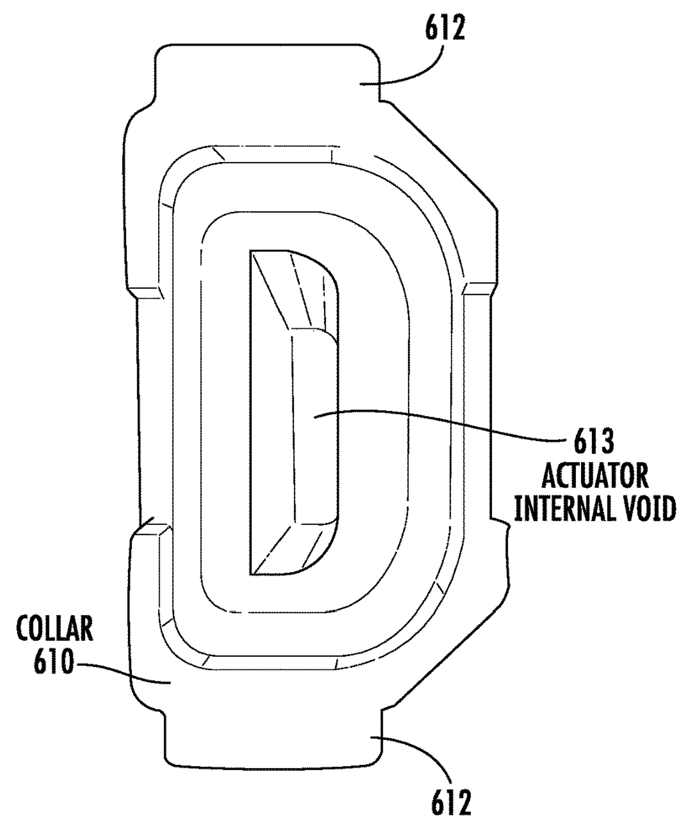
Figure 6E:
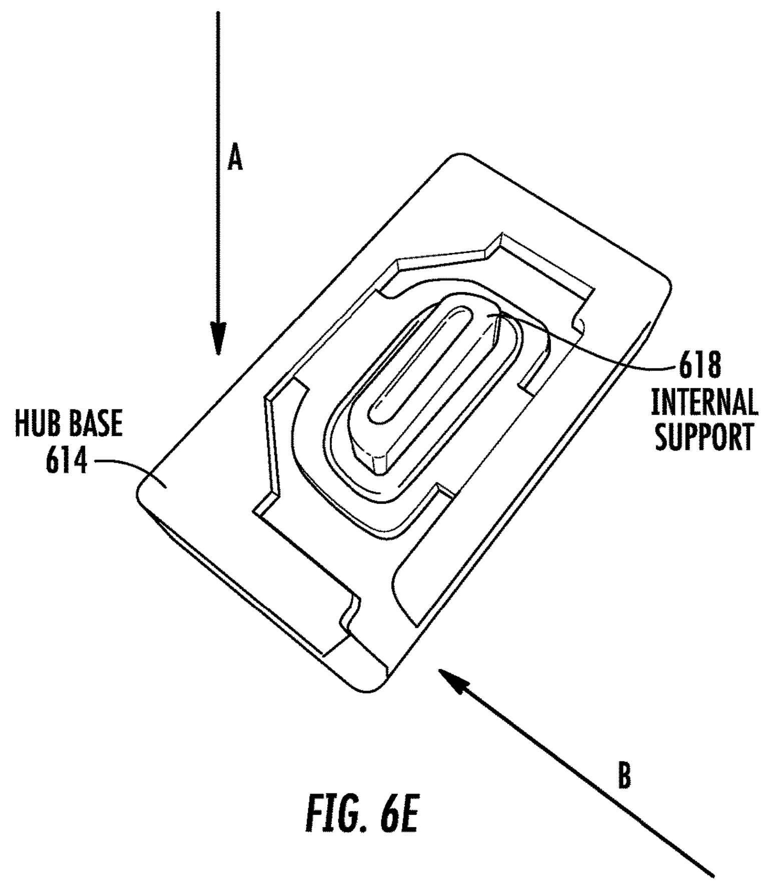
Figure 6F:
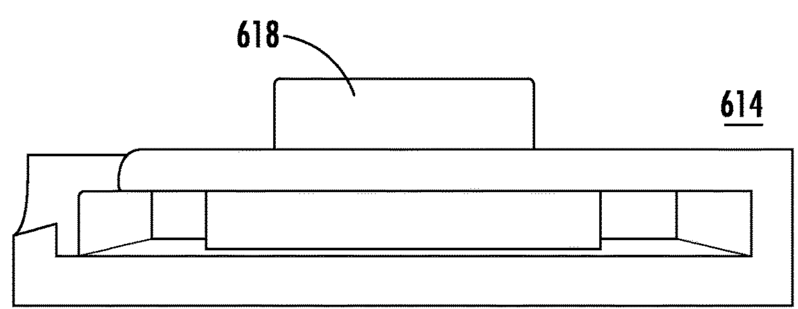

FIG. 6B depicts an example of a locking pin 602. The locking pin 602 includes, e.g., two wings 604 that extend from a rear wall 608. When assembled, the top walls 608 of the wings 604 of the locking pin 602 may seat over flanges in the collar (FIGS. 6C-6D). Side walls 606 of the wings 604 of the locking pin 602 may be seated under a flange of the hub base (FIGS. 6E-6F). As a result, when the actuator 100 is inflated with inflation fluid, the collar pushes against the locking pin 602, which pushes against the base. An internal space (the space between the wings 604) is sized and configured to allow the locking pin 602 to fit around and behind the collar when the collar is placed into the base.

FIGS. 6C-6D depicts the actuator 100 and collar 610 in more detail. The actuator 100 may be integral with the collar 610, or the actuator 100 may be inserted into the collar 610 in a manner similar to that described above with respect to the collar 204. The collar 610 may include an integrated flange 612 that, upon assembly, is secured against a wing 604 of the locking pin 602 within the hub base. Upon actuation (e.g., by suppling an inflation fluid to the actuator internal void 613), the flange 612 may be pushed against the locking pin 602 and consequently the hub base to securely maintain the actuator 100 and collar 610 in the hub base.

As shown in FIG. 6E-6F, the hub base 614 may include an internal support 618 with one or more openings for suppling or removing an inflation fluid to/from the actuator internal void 613. The internal support 614 may further be shaped and configured to assist in holding the actuator 100 on the hub base 614, and may optionally be provided with one or more barbs for this purpose, as described below. The hub base 614 may include one or more openings sized and shaped to receive the flanges 612 of the collar 610.

Figure 6G:
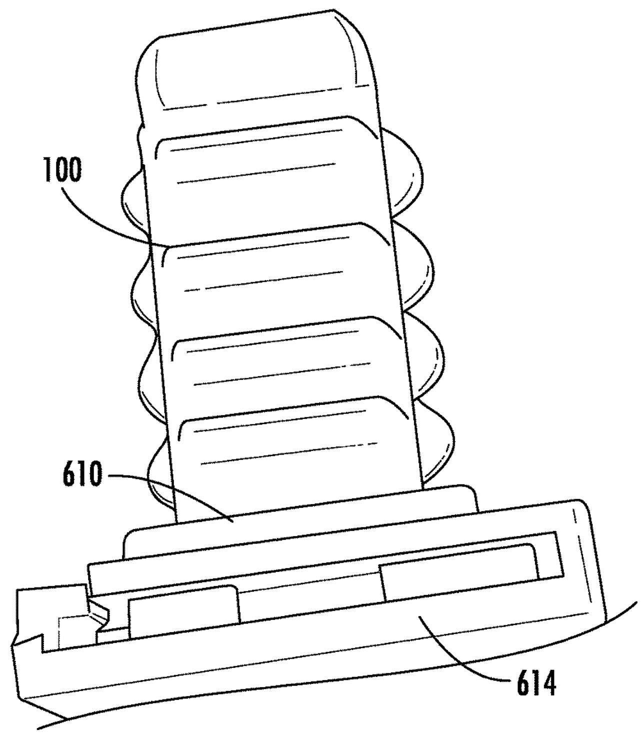
Figure 6H:
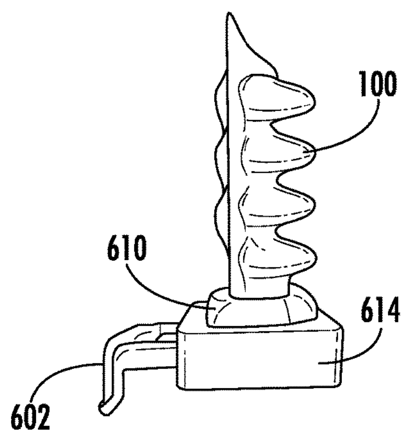
Figure 6I:
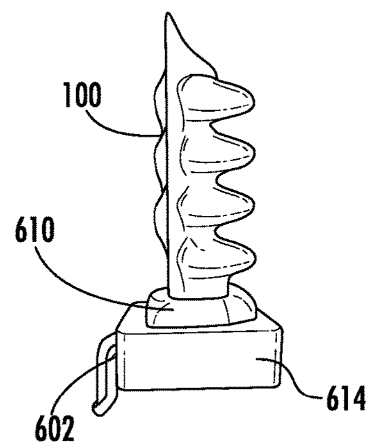

The actuator 100 may be secured to the hub base 614 by first inserting the actuator 100 and collar 610 into the hub base 614 (in the direction of the arrow "A" in FIG. 6E). Once the actuator 100 and collar 610 are inserted, the locking pin 602 may be inserted into the rear of the hub base 614 (the rear of the hub base is depicted in FIG. 6F; the locking pin 602 may be inserted in the direction of the arrow "B" in FIG. 6E; the full installation is shown in FIGS. 6G-6I).

The locking pin 602 may be held in the hub base 614 due to friction and due to the mating of cam locking features present on the locking pin 602 and the hub base 614 and/or the collar 610. In the depicted embodiments, the locking pin 602 is inserted into the base 614 at a ninety-degree angle to the force applied to the actuator 100 when the actuator 100 is inflated (typically opposite the direction of the arrow "A" in FIG. 6E). As a result, this force tends to push the locking pin 602 upwards into the flange 612 of the collar 610, instead of sideways out of the hub base 614.

Furthermore, a protruding feature on the collar flange 612 and a recession feature on the locking pin 602 may be configured to mate with each other. These corresponding features may be sized such that, when sliding against each other, they introduce vertical compressing in an elastomeric flange of the actuator 100, which provides resistance to pushing in the locking pin 602 (similar to the spring in the preceding embodiment). Thus, with a certain installation force, it is possible to slide the two cam features into place above each other (optionally resulting in haptic or audible feedback, such as a clicking as the features lock into place). The removal force needed to disengage the cam features is similar to the installation force.

Quick-Change Hub with Snap-on Support and Hard Stop

Figure 7A:
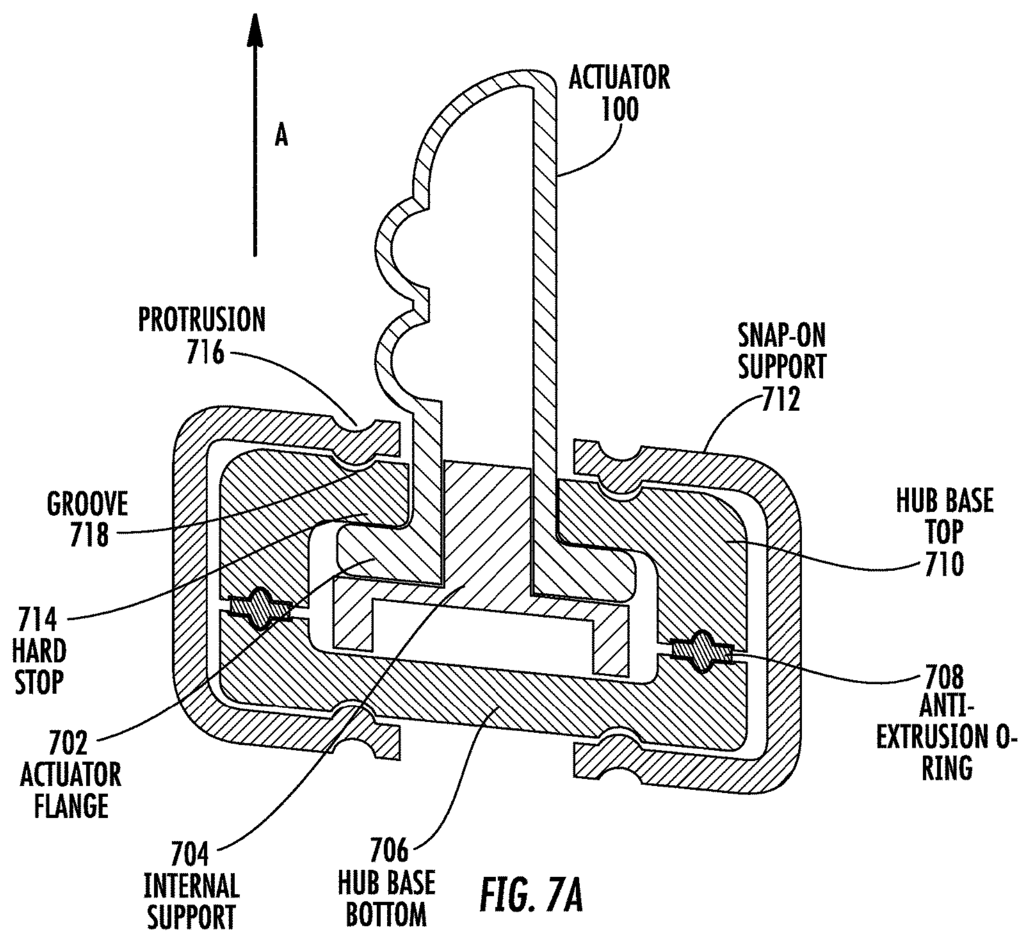
FIGS. 7A-7B depict an example of a hub base having snap-on supports.

Another example of a quick-change hub is depicted in FIG. 7A. In this embodiment, one or more snap-on supports 712 are sized and configured to snap around a hub base top 710 and a hub base bottom 706, thereby clamping the base top 710 and base bottom 706 together. Protrusions 716 in the support 712 may match grooves 718 in the hub base top 710 and hub base bottom 706 to align the snap-on support 712 and secure it to the hub base.

Figure 7B:
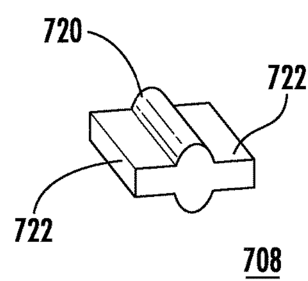

The hub base may include openings for receiving one or more o-rings 708, in order to provide a seal to prevent inflation fluid from escaping the internal structure of the hub base. In the depicted embodiment, extrusion resistant o-rings 708 (FIG. 7B) are utilized in order to prevent the o-rings 708 from extruding outside the hub base when the snap-on support 712 is snapped onto the hub base. According to some embodiments, an anti-extrusion o-ring 708 can prevent liquid, food, and bacterial ingress in addition to providing pneumatic sealing. In other embodiments, the anti-extrusion o-ring 708 only provides ingress protection and another sealing feature (not shown) may provide pneumatic sealing.

The snap-on support 712 embodiments may be advantageous in situations in which bacterial harborage points should be minimized (e.g., in food handling). When retaining screws are used to secure the hub base portions together, a number of small crevices are created which can harbor bacteria. By providing snap-on supports 712 having relatively wide internal radii, each part of the snap-on support 712, the hub base, etc. can be disassembled and easily cleaned.

In some embodiments, the hub base top 710 may be configured with a hard stop 714 (e.g., a flat, abrupt edge) that extends over a flange 702 on the actuator 100. When the actuator 100 is filled with inflation fluid, the actuator 100 tends to push away from the base in the direction of the arrow labeled "A." The hard stop 714 of the base contacts the actuator flange 702 and prevents the actuator 100 from pushing away from the base.

In some conventional configurations, an actuator 100 may be secured to an internal support with a collar that wraps around the base of the actuator 100, between the proximal end of the actuator and the first accordion extension. Problematically, when the actuator 100 is inflated this region tends to expands (and, when the inflation fluid is removed, this region tends to contract). During this expansion and contraction, a collar in this region may abrade against the material of the actuator 100. Throughout repeated inflations and deflations, this area may exhibit increased wear, which may cause premature actuator failure. By securing the actuator 100 through the hard stop 714 at the flange 702 (located at the proximal end of the actuator 100), the actuator 100 can be secured to the hub without increased wear in the expanding and contracting base area.

Barbed Internal Support

Figure 8A:
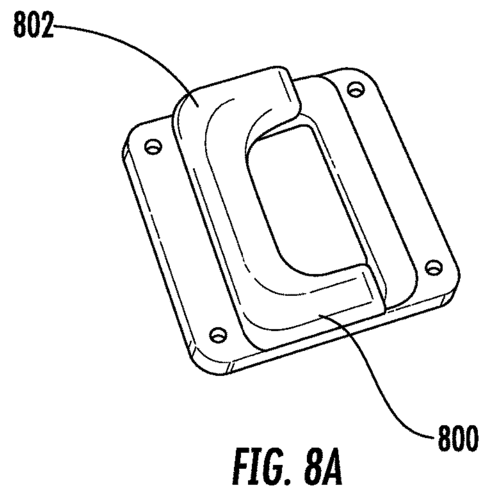
FIGS. 8A-8C depict an example of an internal support structure suitable for use with exemplary embodiments.
Figure 8B:
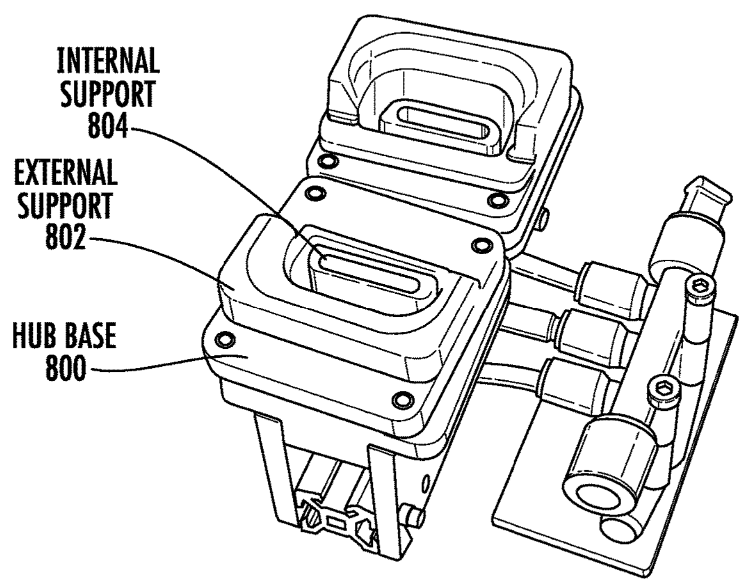
Figure 8C:
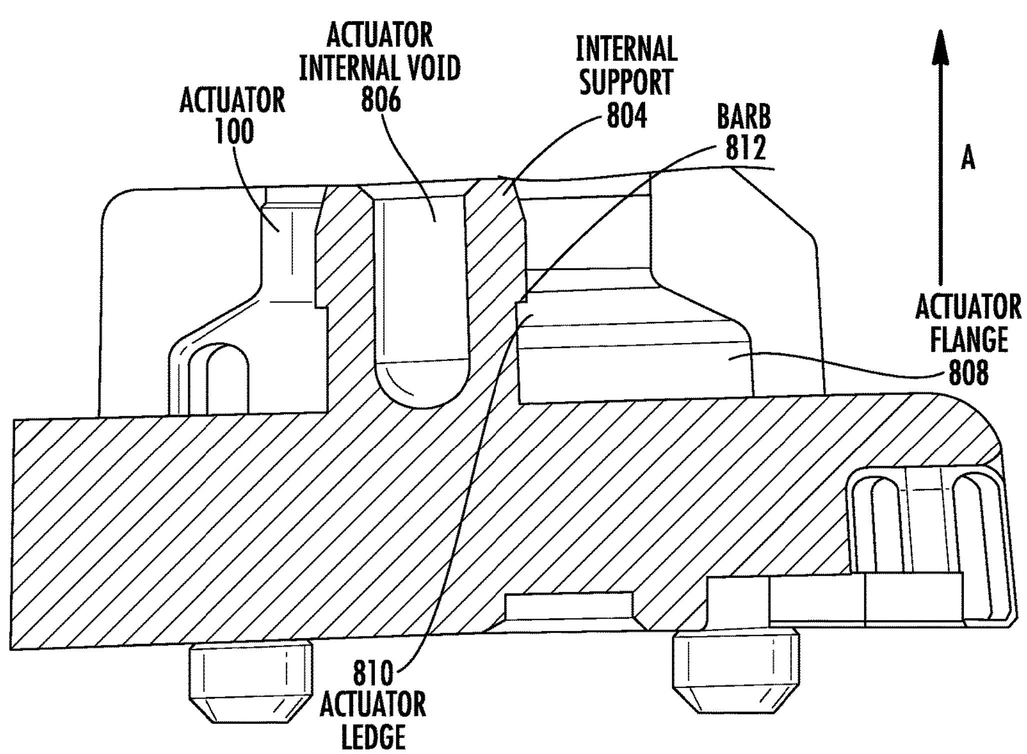

In further embodiments shown in FIG. 8A-8C, which may be used in conjunction with the embodiments described above, a hub 800 may be provided with an eternal support 802 and/or an internal support 804. The internal support 804 may be provided with barbs 812 (e.g., relatively small protrusions) for further locking the actuator 100 in place without the need for (or in addition to) external supports 802 that may serve to secure an external part of the actuator, such as the actuator flange 808 (an example of an external support 802 includes the hard stop described above). More generally, an external support may include any support that holds an exterior part of the actuator 100 to the base. An internal support may include any support that holds an inside portion (e.g., the internal wall defining the actuator void) of the actuator. Problematically, external supports 802 can sometimes provide harborage points for bacteria, since they are located on the outside of the actuator in a region that tends to accumulate the materials that the actuator interacts with. On the other hand, an internal support 804 may be exposed only to the inflation fluid (air, in many cases), which means that such a support tends to accumulate less dirt and bacteria.

For the exemplary embodiment depicted in FIG. 8C, when the actuator 100 is inflated, the actuator 100 tends to push away in the direction of the arrow "A." A ledge 810 on the inside of the actuator 100 (e.g., provided on a wall of the internal void 806 of the actuator 100) mates to the barb 812 on the internal support 804 of the hub base, and pushes against the barb 812 during inflation. As a result, the actuator 100 is restrained and maintained on the hub base without necessarily being supported externally.

The invention claimed is:

1. A system comprising:
- a soft robotic actuator comprising:
  - an elastomeric material defining an internal void configured to be inflated with an inflation fluid, and
  - an external support structure located on an exterior side of the actuator;
- a hub comprising an opening for providing the inflation fluid to the soft robotic actuator; and
- a collar for securing the actuator to the hub, the collar comprising an opening sized and shaped to accept the actuator, walls of the opening being sized and shaped to restrain the external support structure of the actuator, wherein the collar further comprises a plurality of posts sized and shaped to fit into corresponding post holes in the hub, and wherein the hub comprises a release structure configured to release the posts from the hub.

2. The system of claim 1, wherein the posts comprise a reduced diameter portion configured to fit into holes in the release structure.

3. The system of claim 2, wherein each of the holes has a key-hole shape comprising a large diameter portion that is larger than an overall diameter of the post and a small diameter portion that is larger than a diameter of the reduced diameter portion of the post but smaller than the overall diameter of the post, the release structure configured to bias the small diameter portion towards a corresponding post hole in the hub when in a neutral state.

4. The system of claim 1, further comprising a locking pin configured to be inserted into the hub to secure the collar to the hub.

5. The system of claim 4, wherein the locking pin includes a plurality of wings sized and shaped to slide over corresponding flanges on the collar.

6. The system of claim 4, wherein the locking pin comprises one or more cam structures configured to interlock with corresponding structures on the collar to further secure the collar to the hub.

7. The system of claim 1, wherein the hub is divided into a hub top and a hub bottom, and further comprises one or more alignment pins for aligning the hub top to the hub bottom during installation.

8. The system of claim 1, wherein the hub further includes an inflation fluid channel sized and shaped to deliver the inflation fluid from an inlet in the hub to the opening in the hub for providing the inflation fluid to the soft robotic actuator.

9. The system of claim 1, wherein the hub further includes a base mounting structure sized and shaped to secure the hub to a robotic arm.

10. A hub for supporting a soft actuator, the hub comprising:

a hub base top and a hub base bottom, the actuator configured to be held between the hub base top and the hub base bottom without using a retaining screw; and at least one of a hard stop configured to restrain the soft actuator via an external flange on the soft actuator, or an internal support configured to be inserted into an internal void of the actuator and secure an internal wall of the actuator; and an extrusion-resistant o-ring provided in a groove between the hub base top and the hub base bottom.

11. The hub of claim 10, wherein the internal support comprises one or more barbs configured to mate with corresponding ledges on the interior wall of the actuator.

12. The hub of claim 10, further comprising a snap-on support configured to at least partially encompass the hub base top and the hub base bottom, wherein the snap-on support includes protrusions configured to fit into grooves in at least one of the hub base top or the hub base bottom.

* * * * *